H. NICODEMUS.
WHEEL LOCKING DEVICE.
APPLICATION FILED MAR. 16, 1920.
1,401,721.  Patented Dec. 27, 1921.
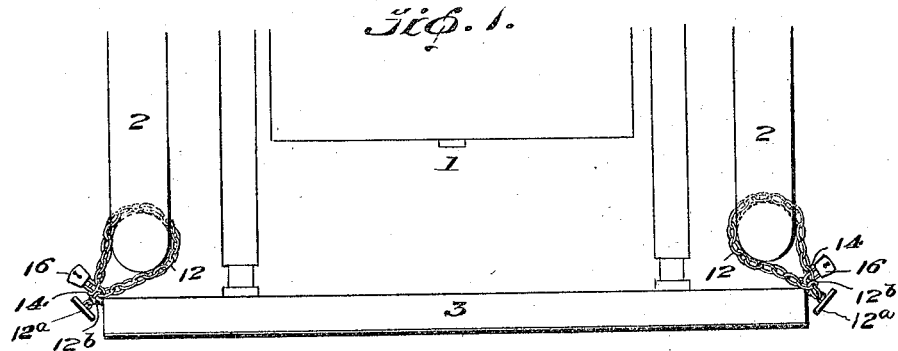
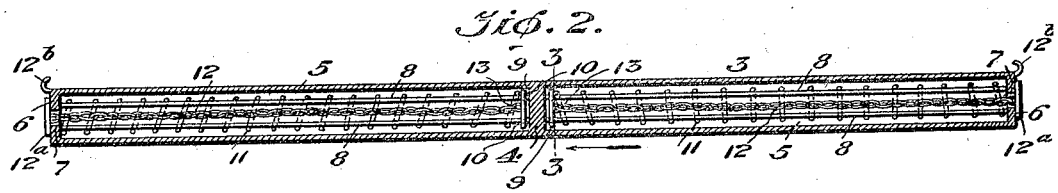
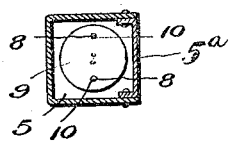
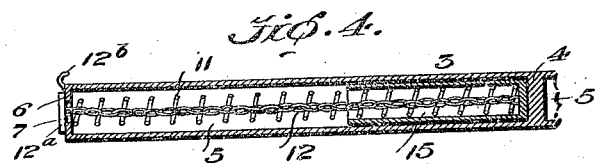
INVENTOR.
Harry Nicodemus,
BY Blackwood Bros,
ATTORNEYS.

UNITED STATES PATENT OFFICE.

HARRY NICODEMUS, OF BALTIMORE, MARYLAND.

WHEEL-LOCKING DEVICE.

1,401,721.  Specification of Letters Patent.  Patented Dec. 27, 1921.

Application filed March 16, 1920. Serial No. 366,310.

*To all whom it may concern:*

Be it known that I, HARRY NICODEMUS, residing at Baltimore city, in the city of Baltimore and State of Maryland, a citizen of the United States, have invented certain new and useful Improvements in Wheel-Locking Devices; and I do hereby declare the following to be a full, clear, and exact description of the invention, such as will enable others skilled in the art to which it pertains to make and use the same.

My invention relates to an improvement in wheel locking devices for vehicles and more particularly to means for use in locking the wheels of an automobile.

The invention consists in the several features and in the construction, combination and arrangement of features as more fully hereinafter described and claimed.

Automobiles are now in such general use and so numerous that they have become a great temptation to thieves, and so called "joy riders" and the number stolen is increasing every day and in view of this fact it has become necessary to devise some efficient means to prevent them from being stolen.

The object of the invention is to obviate the above difficulty and provide means for locking the wheels of an automobile or other vehicle in such a manner that it will prevent the automobile from being stolen and driven away or used by unauthorized persons.

A further object is to provide means for locking the wheels of an automobile or other vehicle which is mounted on and carried by the automobile.

A further object is to provide means for locking the wheels of a vehicle in which the means for engaging a wheel is operatively controlled by extensible and contractible means.

A further object is to provide means for locking the wheels of an automobile or other vehicle which is simple, inexpensive, durable and strong in construction, easy to apply, attractive in appearance, and which attains results which are very effective.

Referring to the drawings:—

Figure 1 is a top plan view of a portion of the front end of an automobile and bumper showing my invention applied thereto as it appears when in use.

Fig. 2 is a horizontal section of a bumper showing my invention therein in full lines.

Fig. 3 is a cross-section taken on the line 3—3 of Fig. 2.

Fig. 4 is a sectional view of one end of a bumper with a modified form of my invention applied thereto.

Fig. 5 is a sectional view of one end of a bumper with another modified form of my invention applied thereto.

In the drawings in which similar reference characters denote similar parts throughout the several views, 1 represents the front end of an automobile having front steering wheels 2 and a bumper 3, well known as the tubular or channel type and attached or secured to the automobile in the usual well known manner.

The bumper 3 is provided with a centrally disposed partition or dividing element 4 by the use of which two compartments or chambers 5 are formed therein the outer end 6 of each of said compartments being provided with a central hole or aperture 7.

Each of the compartments or chambers 5 is provided with a plurality of longitudinally extending rods 8 the inner end of each rod being mounted or secured in the central partition 4, while the outer end is mounted or secured in the end 6 of the bumper.

A longitudinally slidable plate 9 is mounted on the rods 8, the rods passing through holes or apertures 10 therein, and a spiral spring 11 is mounted on and surrounds the rods above referred to, one end abutting against the longitudinally slidable plate 9 and the other end against the end 6 of the bumper.

A chain 12, which may be of any desired design or make and covered or incased in a sleeve of any suitable material, not shown, is provided the extreme inner end 13 of which is secured to the longitudinally slidable plate 9 and after extending along the compartment or chamber 5, centrally of the rods and spiral spring, it passes out through the hole or aperture 7 in the outer end of the bumper and is provided with a disk 12$^a$ adapted to be held over the hole 7 by means of the tension of spring 11 forming a cover or closure for the end of the bumper, a lug or hook 12$^b$ being provided at each end of the bumper on which the chain is hooked after it has been drawn out of the bumper a sufficient distance to provide enough length of chain to embrace or be looped around the automobile wheel, and after being looped around the automobile wheel the outer end 14 is locked by means of the padlock 16 to one of the links of the chain.

The hook 12$^b$ serves to hold the chain so that there will not be any tension on that portion of the chain which loops around the wheel.

In the modified form of my invention shown in Fig. 4, the rods are eliminated and a longitudinally slidable sleeve or tube 15 is provided to which the chain 12 is secured, the sleeve serving to guide the spring. In the modified form of my invention shown in Fig. 5, the rods and sleeve are both eliminated and the spring secured directly to the partition 4.

In use the chain is pulled outward the desired distance and hooked over the lug 12$^b$, which action causes the plate 9 to slide on the longitudinal rods 8 and compresses the spiral spring 11, and the outer portion of the chain is looped around the automobile wheel and the end locked to one of the links of the chain by the padlock and as soon as the padlock is unlocked and the chain released the spring expands longitudinally and pulls the chain inward and the disk 12$^a$ is caused to cover the hole 7 the result being that the chain is held taut in the bumper by the tension of the spring.

I do not wish to be understood as limiting myself to the specific details of construction and arrangement as herein described and illustrated, as it is manifest that variations and modifications may be made in the features of construction and arrangement, in the adaption of the device to various conditions of use, without departing from the spirit and scope of my invention and improvements. I therefore reserve the right to all such variations and modifications as properly fall within the scope of my invention and the terms of the following claims.

What I claim is:—

1. In a locking device for vehicles, a casing, extensible and contractible means therein, means adapted to engage a wheel connected therewith, locking means for the same and a closure for the said casing carried by the wheel engaging means.

2. In a locking device for vehicles, a bumper provided with a spring, a slidable plate, a chain connected to said slidable plate and its outer end adapted to be looped around a wheel and means for locking said chain.

3. In a locking device for vehicles, a bumper provided with a plurality of rods, a spring surrounding said rods, a plate slidable on said rods and a chain connected to said plate.

4. In a locking device for vehicles, a casing provided with a partition, a plurality of rods having one end mounted in said partition and the other end mounted in the end of the casing, a spring surrounding said rods, a slidable plate mounted on said rods, a chain connected to said slidable plate and means for locking said chain.

5. In a locking device for vehicles, a casing provided with a spring, slidable means, flexible means connected to said slidable means and extending out of the casing and adapted to engage a wheel and means for locking the flexible means.

6. In a locking device for vehicles a casing provided with a spring, slidable means, flexible means connected to said slidable means, and extending out of the casing and adapted to engage a wheel, a lug on the casing designed to be engaged by the flexible means and hold the same in its outward position and means for locking the flexible means.

7. In a locking device for vehicles, a bumper provided with means for engaging the wheel of a vehicle, a closure for said bumper connected to said wheel engaging means, extensible and contractible means connected to the wheel engaging means, and means for locking the wheel engaging means to the wheel.

8. In an automobile lock, a hollow bumper-bar, a flexible member housed within the bumper-bar and adapted to be withdrawn therefrom, means for limiting the withdrawing movement of the flexible member, yieldable means acting to draw the flexible member into the bumper-bar, and means carried by the flexible member for limiting its movement into the bumper-bar under action of the yieldable drawing means.

In testimony whereof I have affixed my signature.

HARRY NICODEMUS.